United States Patent [19]

Dohogne

[11] Patent Number: 4,937,482

[45] Date of Patent: Jun. 26, 1990

[54] VOLTAGE AND ROTATION SWITCHING DEVICE

[75] Inventor: L. Ranney Dohogne, St. Louis County, Mo.

[73] Assignee: Emerson Electric Co., St. Louis, Mo.

[21] Appl. No.: 360,355

[22] Filed: Jun. 2, 1989

[51] Int. Cl.[5] .................. H02K 11/00; H01R 27/00
[52] U.S. Cl. .................................. 310/71; 174/66; 310/89; 439/217; 439/491
[58] Field of Search .............. 310/71, 89, 88; 439/217, 222, 224, 171, 173, 166, 189, 218, 221, 488, 489, 491; 124/66

[56] References Cited

U.S. PATENT DOCUMENTS

| | | | |
|---|---|---|---|
| 2,238,696 | 4/1941 | Hanley | 439/491 |
| 2,922,054 | 1/1960 | Miller | 310/71 |
| 3,231,767 | 1/1966 | Powell | 310/71 |
| 3,602,748 | 8/1971 | Cocke | 310/71 |
| 4,055,724 | 10/1977 | Manecke et al. | 174/66 |
| 4,429,243 | 1/1984 | Crow | 310/71 |
| 4,748,355 | 5/1988 | Anderson et al. | 310/71 |
| 4,781,610 | 11/1988 | Mercer | 310/71 |
| 4,851,963 | 7/1989 | Miller et al. | 361/356 |

FOREIGN PATENT DOCUMENTS 324007 1/1930 United Kingdom ............... 439/217

Primary Examiner—William H. Beha, Jr.
Assistant Examiner—D. L. Rebsch
Attorney, Agent, or Firm—Polster, Polster and Lucchesi

[57] ABSTRACT

An operating voltage change and motor rotation reversal device for a dynamoelectric machine in the form of an induction motor having simplified structure and operational features. For single phase operation, a preconfigured jumper plug interconnects a multi-receptacle connector socket mounted to a terminal board for the motor to complete one of four unique circuit combination. For three phase applications, a different and separate jumper plug is used to provide two different mating relationships with the connector socket so as to provide two unique circuit combinations. Preferably, the terminal board is physically mounted within the motor housing so that when the single phase or three phase plug is mated with the connector socket, a vertically extending handle of the plug is positioned adjacent to an overlying motor housing cover plate having prearranged openings in it. The cover plate has functional information imprints adjacent the openings. The plug handle-cover plate sequence gives a reversal indication of the motor connection without having to disassemble motor components to obtain the connection information.

21 Claims, 3 Drawing Sheets

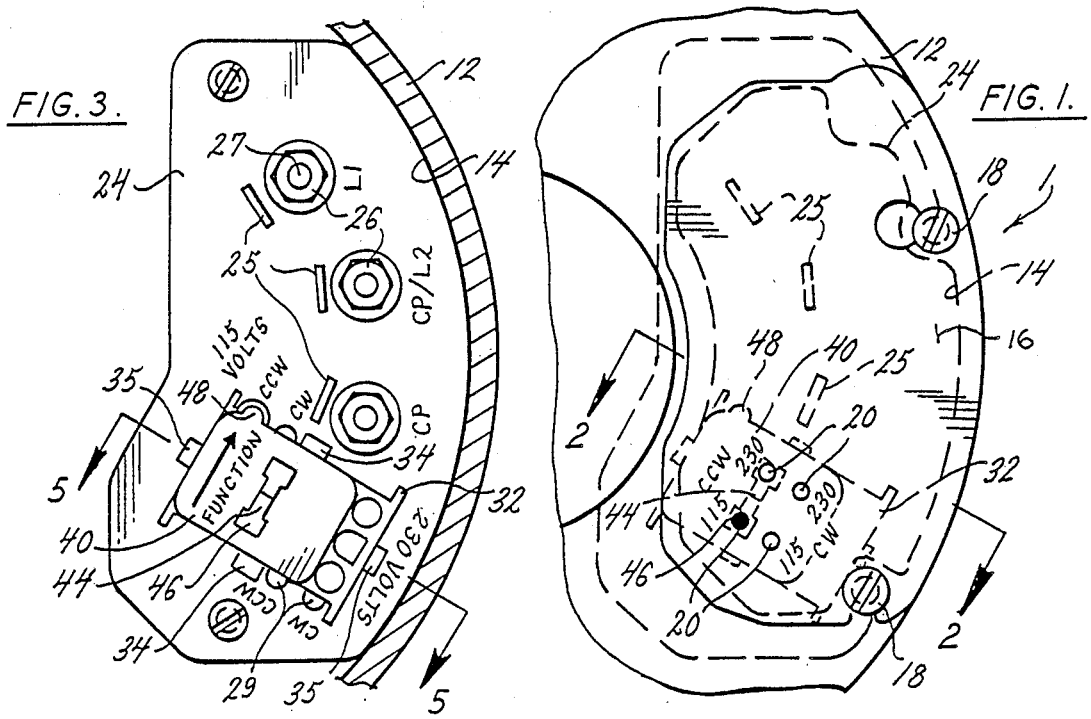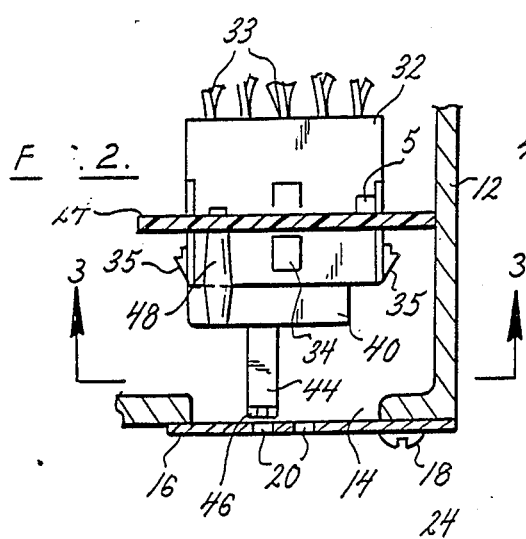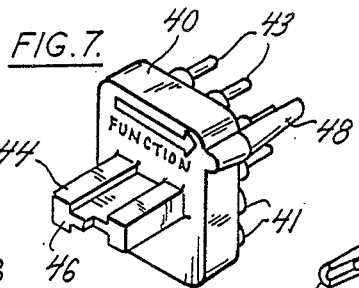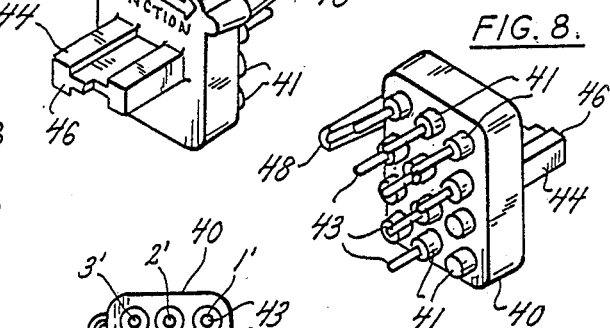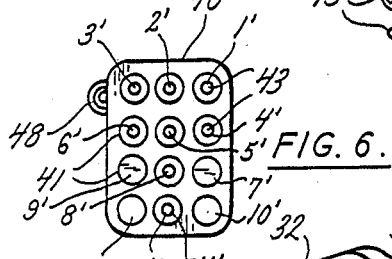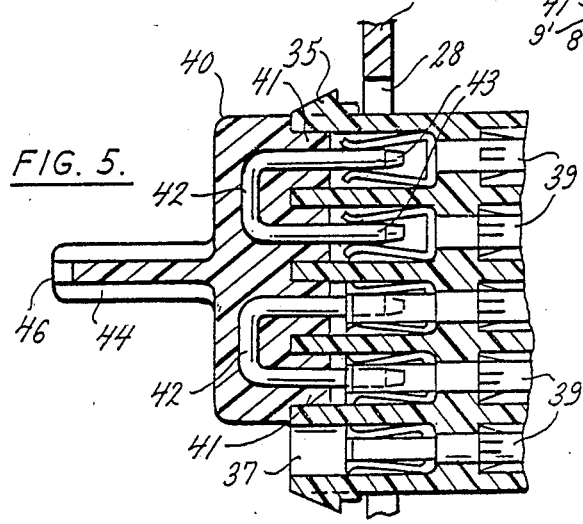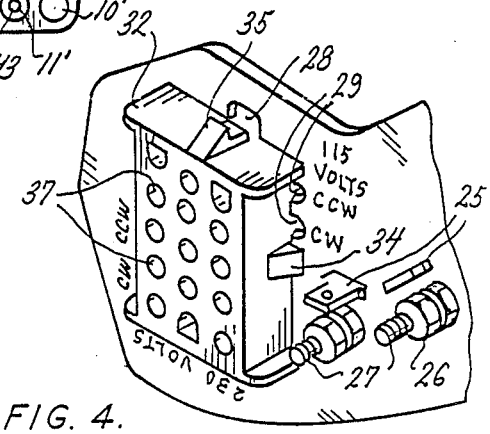

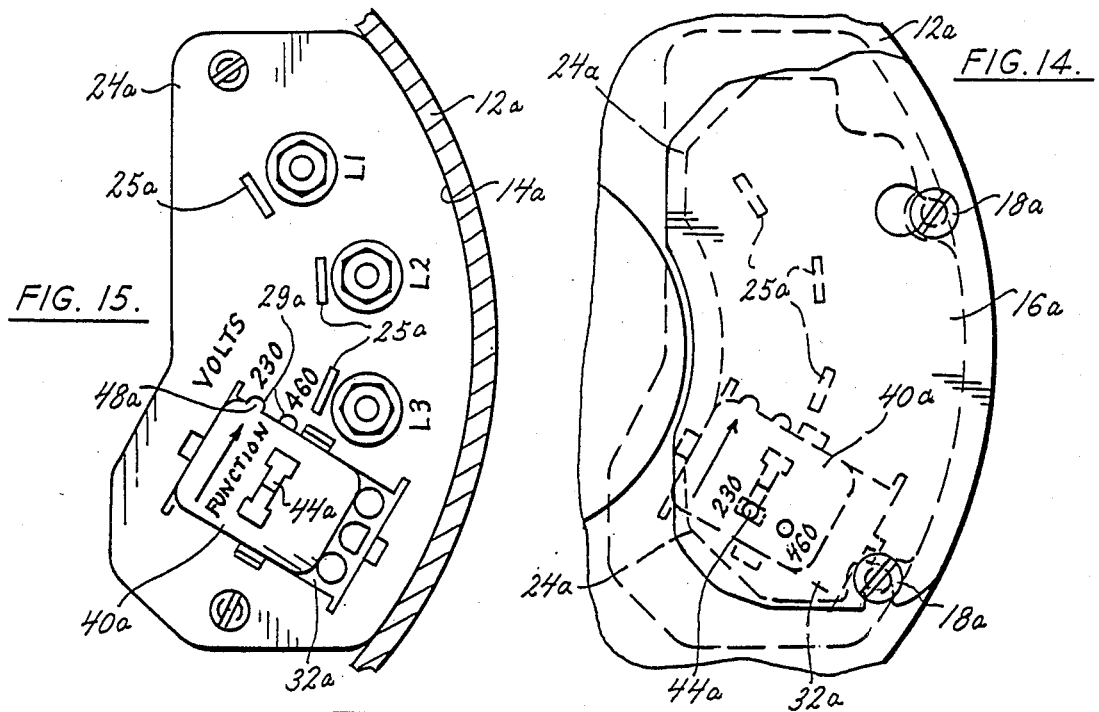
FIG. 15.
FIG. 14.
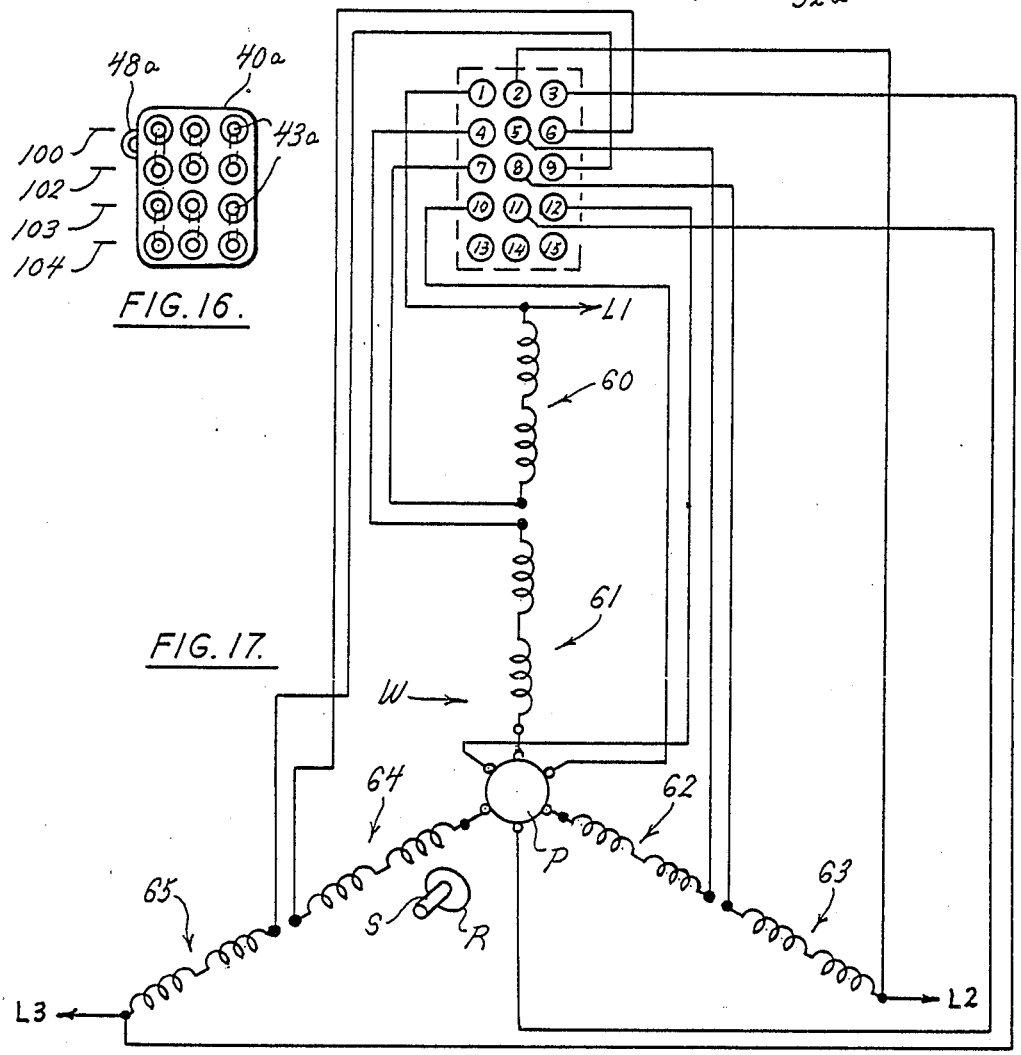
FIG. 16.
FIG. 17.

VOLTAGE AND ROTATION SWITCHING DEVICE

BACKGROUND OF THE INVENTION

This invention relates to dynamoelectric machines, and in particular to electric motors employing a device to change voltage applied to the motor or to change direction of motor rotation, or both.

In many applications, it is necessary or desirable to reverse the rotation of a motor, whether of split phase, capacitor start or run, or three phase designs. Interchanging one or more leads of the motor windings can produce the desired result. The lead interchange typically is accomplished on a terminal board located inside a terminal box attached to or a part of the motor housing. If the leads are not accessible from a terminal box, access to the interior of the motor may be necessary. External reversing switches are also used in some cases.

Where a terminal board is used, spaced lugs mounted to the board with lead identification marked adjacent to each lug on the board frequently are used to permit motor rotation reversal by interchanging connections between two of the lugs. Visibility and access to the lugs and their identifying markings are generally less than desirable. Unless considerable care is exercised in effecting the reversal, particularly in single phase motor designs, the effort may be time consuming or frustrating or, more importantly, wrong.

In addition to rotation reversal, it is often desirable or necessary to operate an appropriately designed motor at one or the other of two different voltages. Thus, if a motor is designed for dual voltage applications, it possible, by switching or changing winding connections, to change the operating voltage of the motor from 115 volts to 230 volts, for example. This is an important feature in many applications because a single motor may be stocked, that motor being usable in a variety of applications by field personnel.

Whether considering dual voltage operation or rotation reversal or a combination of both, care must be exercised when changing circuit connections to avoid motor damage. Typically, information regarding connections required for each operating mode are identified on the motor housing or on a cover plate overlying an internal board where connections are made and changed. Where individual connections are required to effect circuit changes, the opportunities for connection errors and motor damage increase with the number of connections required, the extent to which access to the connections are physically limited, and the amount of information regarding the making of connections that is physically available immediately adjacent to the connectors where the changes will be made.

The prior art has addressed the problem of providing easy and reliable field change of motor connections for a long time. For example, U.S. Pat. No. 4,748,355 discloses a universal motor connector unit that is usable with different three phase and single phase motors for connecting the motors to different source voltages. While the prior art in general works for its particular purpose, the present invention, unlike the prior art and the 4,748,355 patent in particular, utilizes different plug constructions for single phase and three phase applications, and thus provides an entirely different approach for a voltage change and motor reversal device, as will be explained in more detail below. By using separate plugs, visual indications of the resulting motor connection is available to the installer and end user.

SUMMARY OF THE INVENTION

Among the several objects and advantages of the present invention include:

The provision of a voltage and rotation switching device which makes multiple motor connections in a reliable manner, and yet is releasably interlocked to permit separation and change as desired;

The provision of the aforementioned voltage and rotation switching device which makes multiple motor circuit connections by simple manipulation of the switching device;

The provision of the aforementioned voltage and rotation switching device which provides mistake-proof connections;

The provision of the aforementioned voltage and rotation switching device which provides externally identifiable readings of the particular motor connection selected and/or in use;

The provision of the aforementioned voltage and rotation switching device which provides different plug constructions and arrangement for single phase and three phase applications; and The provision of the aforementioned voltage and rotation switching device which is simple and economical to construct, is long lasting and durable in use, and is otherwise adapted for the purposes intended.

The present invention employs a connector socket containing a rectangular matrix of female electrical receptacles, mounted in a connector housing. Respective ones of the electrical receptacles are electrically connected to preselected ones of the motor windings or motor circuit components, which, where appropriately connected at the other end of the electrical receptacle or at alternate locations on electrical lugs affixed to the terminal board and attached to the connector socket, determine the electrical operating conditions of the motor. In the preferred embodiment, the single phase version provides four operating combinations. A high voltage and clockwise rotation may be selected, a high voltage and counter-clockwise rotation may be selected, a low voltage and clockwise rotation may be selected, or a low voltage and counter-clockwise rotation may be selected. The connector socket of the present invention has five rows of three receptacles each arranged in an orthogonal relationship. The mating single phase jumper plug includes four shorting conductors, the ends of which comprise eight male jumper pins for insertion in the appropriate receptacles of the connector socket, to provide any preselected one of four mating relationships described above. For three phase application, the three phase plug has six jumpers interconnecting twelve male jumper pins, and the three phase plug mates with the connector socket in one of two positions to select high or low voltage operation.

The jumper plug, for both single phase and three phase applications, includes a vertical handle extending upwardly from a surface of the plug on an opposite side of the plug from the and male jumper pins. The length of the handle is such that when the plug is inserted into the connector socket and a cover plate is secured to the motor housing, the cover plate will be close to the end of the handle so that the plug is held securely in the desired position until the cover plate is removed. Further, the cover plate for the single phase jumper plug has four apertures or openings located so that a portion of the top of the plug handle, will be visible through one of the apertures, depending upon which one of the four positions is chosen for the single phase jumper plug. Markings on the exterior surface of the cover plate, adjacent to each aperture, indicate the four possible positions of the single phase jumper plug relative to the four operating combinations of the motor. The cover plate, for three phase application, has two apertures to indicate high and low voltage connections, in a similar manner.

BRIEF DESCRIPTION OF THE DRAWINGS

In the drawings, FIG. 1 is a fragmentary end view of a portion of a motor, for single phase applications, showing a cover plate overlying an electrical terminal board of the motor;

FIG. 2 is a partial sectional view taken along line 2—2 in FIG. 1;

FIG. 3 is a sectional view taken along line 3—3 of FIG. 2;

FIG. 4 is a fragmentary perspective view of a connector socket used with the single and three phase jumper plugs of the present invention;

FIG. 5 is a partial sectional view taken along line 5—5 of FIG. 3;

FIG. 6 is an end elevational view of the mating face of a single phase jumper plug of the present invention;

FIG. 7 is a front perspective view of the plug of the present invention for single phase operation;

FIG. 8 is rear perspective view of the connector plug of FIG. 7;

FIG. 14 is a fragmentary elevation view of a portion of a motor showing a cover plate overlying an internal terminal board for three phase motor connection;

FIG. 15 is a view corresponding to FIG. 3, illustrating the poly phase connection device of FIG. 14;

FIG. 16 is an elevation view of the mating face of the jumper plug for three phase motor connections; and FIG. 17 is a three phase motor winding schematic diagram showing connections to the connector socket of the present invention.

DESCRIPTION OF THE PREFERRED EMBODIMENT

Figure 9:
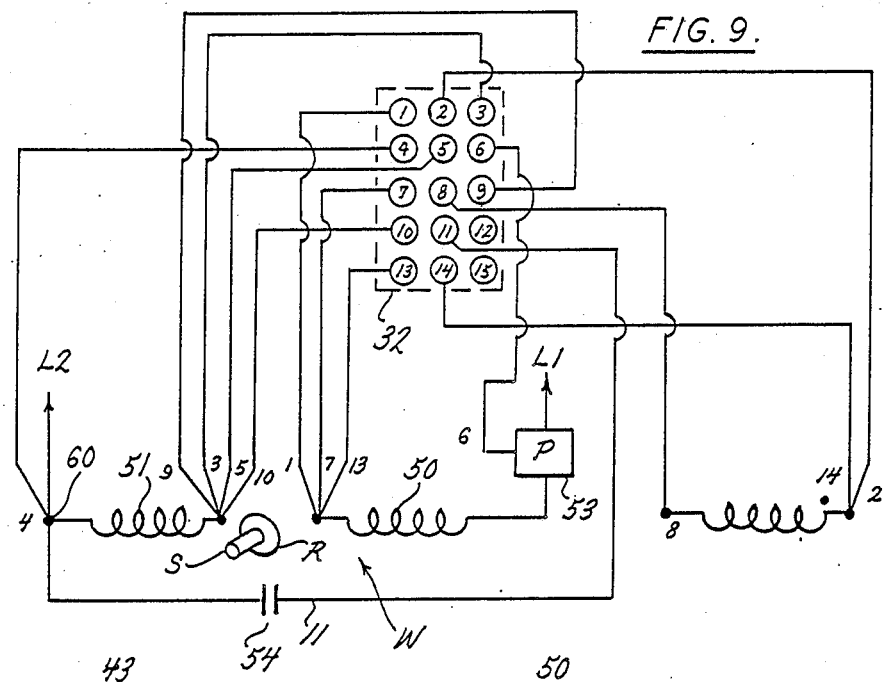
FIG. 9 is a single phase motor winding schematic diagram showing connections to the connector socket of FIG. 4.

Referring now to the drawings of one illustrative embodiment of the connection device of this invention, FIGS. 1–13 show a single phase version of the connection device while FIGS. 14–17 show the three phase version thereof.

As illustrated in FIG. 1, a portion of a motor 1 is shown to include a housing 12 in which the present invention is illustrated. Motor 1 conventionally includes a stator assembly (not shown) and a rotor assembly R, shown diagrammatically in FIGS. 9 and 17. The stator assembly carries the motor windings W, described in greater detail below. The rotor assembly is mounted for rotation on suitable bearings, not shown, and a shaft S extends outwardly of the motor to convert the electrical input to the motor 1 to mechanical work. The above structure all is conventional and forms no part of the present invention. Conventionally, the windings W are connected to a source of electrical energy at a terminal board 24. In the preferred embodiment, the above structure is contained in the housing 12.

A cover plate 16, secured to the motor housing 12 by means of machine screws 18, closes an opening 14 in the motor housing 12 during normal operation of the motor. The opening 14 provides access to the terminal board 24, which, as indicated, is mounted within the motor housing 12, and supports a connector socket 32. A single phase jumper plug 40 is shown inserted in the socket 32. The cover plate 16 has apertures or openings 20 located so that at least one aperture overlays a handle 44 of the single phase plug 40 when it is in one of the four possible connection relationships with the connector socket 32. Preferably, information is imprinted or otherwise carried on the cover plate 16 adjacent to each aperture 20 in order to reveal or permit observation of the actual motor rotation and operating voltage connections, without removing the cover plate 16. This is an important feature of the present invention, in that it allows the installer or end user to check visually the motor operation connection at any time.

As shown in FIG. 2, the connector socket 32 is mounted to the terminal board 24. The terminal board 24, in turn, is secured to the motor housing 12 by any convenient method. Conventional threaded fasteners work well, for example. As indicated, when the single phase jumper plug 40 is inserted in the connector socket 32, the handle 44 will be juxtaposed immediately beneath one of the apertures 20 in the cover plate 16.

The motor circuit leads 33, shown in FIG. 2, enter the rear of the connector socket 32, where the leads are secured to respective, preselected ones of an end 39 of individual ones of a plurality of receptacles 38, as shown in the FIG. 5. Also clearly shown in FIG. 2 is a function tang 48 which extends outwardly from a face of the jumper plug 40. The function tang 48 is intended to extend normal to and passing through the terminal board 24, by way of a specific function slot 29 in the board 24.

The connector socket 32 is provided on opposite sides with opposed, flexible wedge retainers 34, for releasable locking engagement with the terminal board 24, along with orientation wedges 35, which are provided on the other two opposed sides of the rectangular-shaped connector socket 32. The two flexible wedge retainers 34, located on two of the opposite sides of the connector socket 32, as shown in FIG. 2, extend through the terminal board 24. When the connector socket 32 is placed in an opening 28 of the terminal board 24, best seen in FIG. 2, the flexible retainers 34 are collapsed against the side of the connector socket 32, from which they extend. After passing through the terminal board 24, the flexible retainers 34 spring outward from the connector socket 32 to releasably secure it to the terminal board 24, in conjunction with at least one stop 5 positioned on an opposite side of the terminal board 24 material thickness. The opposed orientation wedges 35, 35 also act in guiding/orienting the connector socket 32 into alignment with opening 28, as shown in FIG. 4.

In FIG. 3, a plurality of electrical connection arms 25 are shown affixed to the terminal board 24 by means of the bolts 27, which are secured by the nuts 26. The arms 25 are used to connect a source of electrical power, not shown, to the motor 1 at the terminal board 24. The single phase jumper plug 40 is shown as being connected to the connector socket 32, with the function tang 48 extending down through the terminal board 24 at the function slot 29 identified as 115 volts and counter-clockwise (CCW) rotation. The configuration of the terminal board 24 in FIG. 3 is shown as providing 115 volts or 230 volts, and clockwise (CW) or counter-clockwise (CCW) rotation of the motor shaft. FIG. 3 also shows the raised portion 46 of the handle 44 which is observable through the respective apertures 20 of the cover plate 16, showing in FIG. 1, where the cover plate 16 is imprinted with the voltage and direction of motor rotation, adjacent to the apertures 20.

The functional relationship between the single phase jumper plug 40 and the connector socket 32 is shown in FIG. 5. The U-shaped jumpers 42 are molded within the single phase jumper plug 40, each jumper 42 delimiting a pair of connected jumper pins 43, which extend centrally through and out of an insulation stem 41 integrally molded in the single phase jumper plug 40. Another view of the jumper pins 43 exiting the single phase jumper plug 40 is shown in FIG. 8. When the single phase jumper plug 40 is interconnected to the connector 32, the jumper pins 43 of the single phase jumper plug 40 are frictionally secured within respective U-shaped electrical receptacles 38 mounted in the connector socket 32. The connector sockets 32 in turn secure motor leads 33. The electrical receptacles 38 themselves are received within cylindrical openings 37 formed in the connector socket 32. It will be seen in FIG. 5 that the positioning stems 41 of the jumper plug 40 are constructed to be guidingly received by the cylindrical openings 37 and are formed to ensure proper electrical separation between the receptacles 38 and the mating plug 40. At the same time, each jumper pin 43 is releasably secured by the spring fingers of the U-shaped receptacles 38, to provide the desired electrical connection between the single phase jumper plug 40 and leads 33, when the connector and plugs are mated to one another.

As indicated above, the function tang 48 is located at the side of the single phase jumper plug 40 and extends downwardly in the same direction as the jumper pins 43, as is visible in FIGS. 6–8. The function tang 48 is arranged to be received by an appropriate function slot 29 in the terminal board 24. Specifically, the single phase jumper plug 40 has four motor operating modes to complete four unique circuit combinations. These four motor operating modes are determined by the position of the single phase jumper plug 40 relative to the connector socket 32. The function tang 48 of the single phase jumper plug 40 may be releasably associated with any one of the four function slots 29 providing, as best seen in FIG. 3, 115 volts and counter-clockwise motor rotation or 115 volts and clockwise motor rotation or, upon rotating the single phase jumper plug 40 180°, 230 volts and clockwise motor rotation or 230 volts and counter-clockwise motor rotation.

Referring now to FIG. 6, it may be observed that not all positions of the plug 40 have pins 43 extending from them. Rather, pins 43 extend from positions 1', 2', 3', 4', 5', 6', 8' and 11'. These are arranged so that the U-shaped receptacle is shorted between 3' and 6', 2' and 5', 1' and 4' and 8' and 11'.

Figure 10:
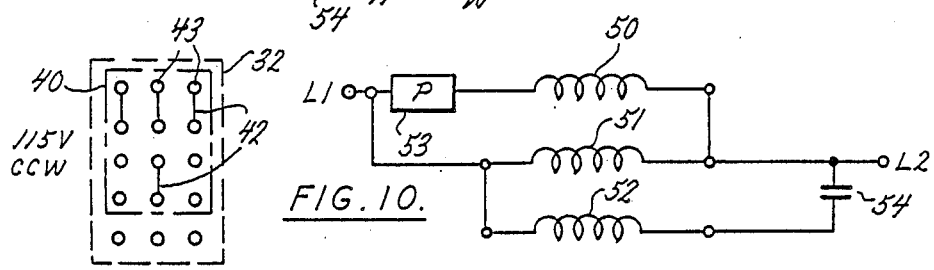
FIG. 10 is a diagrammatic view showing the single phase jumper plug and socket connector relationship to obtain the motor winding connections for 115 volt and counter-clockwise operation.
Figure 11:
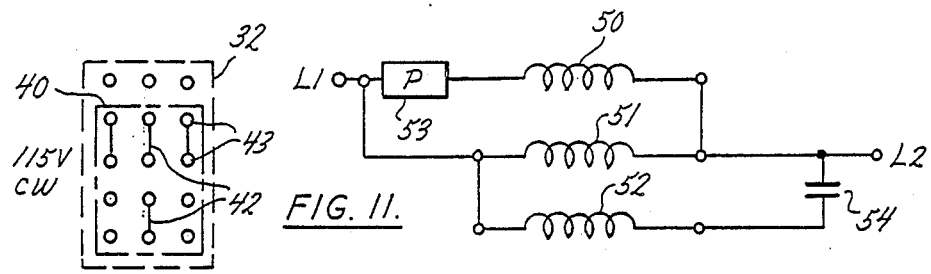
FIG. 11 is a diagrammatic view showing the single phase jumper plug and socket connector relationship to obtain the motor winding connections for 115 volt and clockwise operation.
Figure 12:
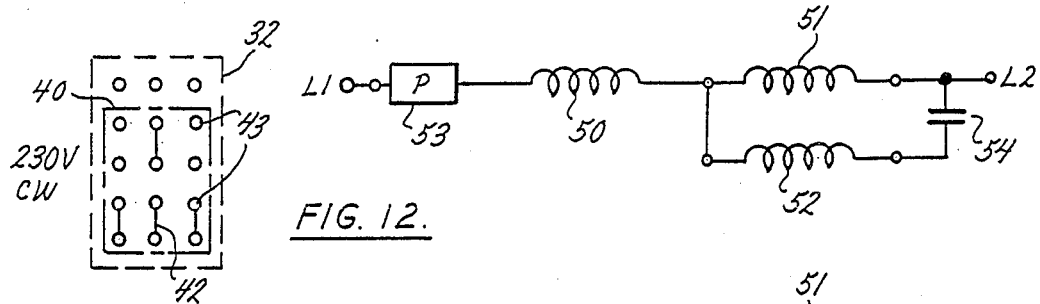
FIG. 12 is a diagrammatic view showing the single phase jumper plug and socket connector relationship to obtain the motor winding connections for 230 volt and clockwise operation.
Figure 13:
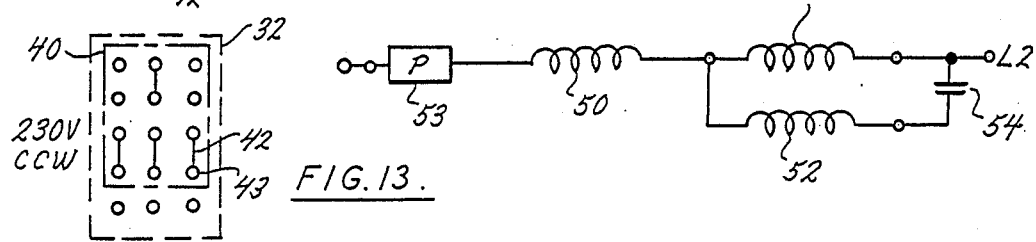
FIG. 13 is a diagrammatic view showing the plug and socket connector relationship to obtain the motor winding connections for 230 volt and counter-clockwise operation.

An electrical schematic showing all connections from the motor winding circuits to the fifteen receptacle connector socket 32 for a single phase, dual voltage and reversible rotation motor is illustrated in FIG. 9. One side of input voltage line 61 is connected to a protector 53. Protector 53 also is connected to one side of a main winding part 50 and to receptacle R6 of connector socket 32. A start capacitor 54 is connected to an a connection point 60 and to a receptacle R11 of connector socket 32. The second side of main winding part 50 is connected to receptacles R1, R7 and R13 of connector socket 32. A first side of a second main winding part 51 is connected to the point 60. Point 60 conventionally is one of the connection arms 25 located on terminal board 25. The second source lead 12 also is connected to point 60. Point 60 in turn is connected to the receptacle R4 of connector socket 32. A second side of main winding part is connected to receptacles R9, R3, R5 and R10 of connector socket 32. A first side of an auxiliary winding 52 is connected to receptacles R8 of connector socket 32, while a second side of winding 52 to connected to receptacles R14 and R2 of connector socket 32, all as shown in FIG. 9. While single winding representations are shown in the drawings, those skilled in the art will recognize that the single windings shown may represent multiple pole windings in actual embodiments of the invention. As thus shown, the motor windings W are connected to all receptacles 38 of the socket 32 except receptacles R12 and R15, which are intentionally left open. As thus is configured, it is possible to use the single eight pin plug 40 with the jumpers 42 connected as described above to complete the circuits appearing in FIG. 10 for 115 volt and counter-clockwise rotation, FIG. 11 for 115 volt and clockwise rotation, FIG. 12 for 230 volt and clockwise rotation and FIG. 13 for 230 volt and counter-clockwise rotation. In FIG. 10, the single phase jumper plug 40 connects receptacles R1 and R4, R2 and R5, R3 and R6, and R8 and R11 of connector socket 32 to make the winding connections shown in that FIG. 10. In FIG. 11, the single phase jumper plug 40 connects receptacles 4 and 7, 5 and 8, 6 and 9, and 11 and 14, to make the winding connections shown and provide 115 volt, counter-clockwise operation. In FIGS. 12 and 13, the single phase jumper plug 40 is turned 180 degrees to provide two additional operating modes for the motor. In FIG. 12, the single phase jumper plug 40 connects receptacles R5 and R8, R10 and R13, R11 and R14, and 12 and 15 to make the winding connections shown and provide 230 volt clockwise operation. In FIG. 13, the single phase jumper plug 40 joins receptacles R2 and R5, R7 and R10, R8 and R11, and R9 and R12 to make the winding connections shown and provide 230 volt, counter-clockwise operation. The changes to motor operation can be made quickly easily and correctly by field personnel without fear of motor damage due to improper lead connections.

FIGS. 14–19 illustrate the poly or three phase operation of the connection device of this invention. Like reference numerals are used for like parts. Where appropriate, the suffix "a" is used to distinguish from the single phase operation.

In FIG. 14, the cover plate 16a has apertures 20a located above the handle 44a of the three phase jumper plug 40a, configured with jumpers 42a (not shown) configuring to form pins 43A as shown in FIG. 16 for dual voltage, dual rotation operation of a three phase motor. The terminal board 24a has a layout accommodating two function operation. Thus, in FIG. 15, two function slots 29a, one for 230 volt and the second for 460 volt operation, are provided to assure proper orientation of the jumper plug 40a by receiving the function tang 48a. FIG. 16 illustrates the three phase plug. As there shown, the pins 43A are arranged in three rows of four pins. As also shown, a row 100 is shorted to a row 102 while a row 103 is shorted to corresponding ones of the pins 43A in the row 104.

The poly phase windings are connected to the connector socket 32a so as to permit dual voltage operation of the motor. Thus, a first side of a winding 60 is connected to receptacle R7. A second side of winding 60 is connected to a source of voltage via lead L1 and to receptacle R1. A first side of a winding 61 is connected to receptacle R4 while a second side of the winding 61 is connected to protector P.

A first side of a winding 63 is connected to a source of voltage via lead L2 and to receptacle R2. A second side of winding 63 is connected to receptacle R8. A first side of winding 62 is connected to receptacle R5, while its second side is connected to protector P.

A first side of a winding 65 is connected to a source of voltage via lead L3 and to receptacle R3. A second side of winding 63 is connected to receptacle R9. A first side of winding 64 is connected to a receptacle R6 while a second side is connected to protector P. Protector P, in turn, is connected to receptacles R12, R10 and R11.

The jumper plug 40a can be inserted into the connector socket 32a to connect the three phase motor winding circuits in FIG. 17 by joining receptacles 38a in receptacle positions R1 and R4, R2 and R5, R3 and R6, R7 and R10, R8 and R11, and R9 and R12 to produce a parallel Y circuit for low voltage operation. The receptacle positions 13, 14 and 15 are intentionally left open. In the low voltage (230 volts) operating mode, the windings 60 and 61 are connected in parallel, as are the windings 62 and 63, and the windings 64 and 65 (FIG. 17). Likewise, by moving jumper plug 40a down one row of receptacles in connector socket 32a, receptacle positions R4 and R7 are joined as are R5 and R8, R6 and R9, R10 and R13, R11 and R14, and R12 and R15. Since receptacle positions R13, R14 and R15 are open, the motor circuit produced is a series Y winding arrangement for high voltage operation. In the high voltage (460 volts) operating mode, the windings 60 and 61 are connected in series, as are the windings 62 and 63 and the windings 64 and 65, as shown in FIG. 17. Rotation may be reversed merely by interchanging one of the L1, L2 or L3 leads on the terminal board 24 itself.

The terminal board 24 is preferably fabricated from 0.94 inch thick phenolic fiber board and has functional information imprinted adjacent to each function slot 29. The connector socket 32 is an AMP MAT-N-LOK 15 pin socket and the single phase jumper plug 40 and three phase jumper plug 40a are molded from suitable material such as Valox 420 SEO plastic material, with the function tang 48 molded as an integral part of the plug, in both cases. Jumpers 42 are made from electrically conductive material such as copper alloy, for example.

In view of the above, it will be seen that the several objects and features of this invention are achieved and other advantageous results have been obtained.

As various changes could be made in the above constructions without departing from the scope of the invention, it is intended that all matter contained in the above description or shown in the accompanying drawings shall be interpreted as illustrative and not in a limiting sense. For example, the design and location of the connector socket 32 may be altered in other embodiments of this invention. Likewise, the location of function tang 48 may be altered, if desired. Though described as being preferably mounted on the terminal board 24, other locations for the socket 32 may be utilized if desired. Likewise, the design of the receptacles 38 or the pins 43 may be altered in other embodiments of the invention. While certain materials are described as preferred, other materials may be substituted. These variations are merely illustrative.

Having thus described the invention, what is claimed and desired to be secured by Letters Patent is:

1. A voltage and rotation switching device mounted to a motor housing for connecting motor windings to a power source and changing connections to change the direction of motor shaft rotation, comprising:

a connector socket having a plurality of spaced electrical receptacles, one end of each electrical receptacle being adapted to receive a mating connection and the other end of each electrical receptacle being affixed to a circuit lead within said motor housing;

a terminal board mounted to said motor housing and having an opening sized and shaped to receive and securely retain said connector socket, said board further having a plurality of spaced slots extending transversely out from and on opposite sides of said opening, and a plurality of electrical arms to which line connections are made on the opposite side of said board from which said internal motor circuit leads are connected to said connector socket; and a jumper plug mating with said connector socket for completing electrical connections therebetween, said jumper plug having a plurality of electrically conductive jumpers disposed for mating with pairs of electrical receptacles in said connector socket, each of said electrical receptacle pairs being also connected to the leads of an otherwise open internal circuit, and said jumper plug having a function tang extending vertically down along one side and normal to the mating face of said jumper plug indicative of the function connection the jumper plug makes when mated with said connector socket, said function tang extending through one of said transverse slots in said terminal board in order to determine the selected voltage and motor rotation desired.

2. The voltage and rotation switching device as recited in claim 1 wherein said jumper plug includes a plurality of positioning stems which are located to align and guide the entry of said jumpers into corresponding receptacle cylinders of said connector socket.

3. The voltage and rotation switching device as defined in claim 2 wherein a plurality of said positioning stems are joined into pairs by U-shaped jumpers, said U-shaped jumpers having free ends forming jumper pins extending centrally out from outer free ends of said positioning stems for snug interfitting engagement with said receptacles.

4. The voltage and rotation switching device of claim 3 wherein said connector socket receptacles are arranged in a rectangular matrix of five rows by three columns, and said jumper plug pins are disposed in a mating matrix of four rows by three columns.

5. The rotation and voltage switching device of claim 5 wherein said jumper plug includes a handle extending vertically up from and normal to an opposing rear face of the mating plug face to facilitate assembly and disassembly of said jumper plug relative to said connector socket.

6. The voltage and rotation switching device of claim 5 further comprising a motor housing cover plate removably secured to said motor housing directly above said terminal board, connector socket and mating jumper plug.

7. The voltage and rotation switching device of claim 6 wherein said cover plate has a plurality of apertures, at least one of which is located directly over said jumper plug handle when mated with said connector socket.

8. The rotation and voltage switching device of claim 7 wherein said jumper plug handle includes a raised portion which is juxtaposed immediately beneath said aperture when said jumper plug is mated with said connector socket.

9. The rotation and voltage switching device as recited in claim 8 wherein said jumper plug is a single phase jumper plug having four jumpers for mating engagement with four pairs of receptacles to complete winding and power connections within said connector socket for any one of four unique combinations of simultaneous motor voltage and rotation including high voltage and clockwise rotation, high voltage and counter-clockwise rotation, low voltage and clockwise rotation, and low voltage and counter-clockwise rotation.

10. The device as recited in claim 8 wherein said jumper plug is a three phase jumper plug having six jumpers for mating engagement with six pairs of receptacles to complete winding connections within said connector socket for any one of two unique combinations of winding connections including a parallel Y for low voltage and a series Y for high voltage applications.

11. The device as recited in claim 9 wherein said single phase jumper plug has a four row by three column orthogonal pattern of positioning stems, the stem pair consisting of the first stem in each of the first and second rows, the pair consisting of the second stem in each of the first and second rows, the pair consisting of the third stem in each the first and second rows, and the pair consisting of the second stem in each of the third and fourth rows having an electrically conductive jumper extending within said single phase jumper plug between said aforementioned stems in each of said aforementioned outer free ends of each of said jumpers comprising jumper pins extending out through an outer free end of each of said stems for mating engagement with the corresponding electrical receptacle in each receptacle cylinder in said connector socket.

12. The device as recited in claim 11 wherein the first through the fourth rows and the second through the fifth rows of said receptacles in said connector socket are the first two of the four unique mating engagements with said single phase jumper plug, and the fifth through the second rows and fourth through the first rows of said receptacles of said connector socket are the second two of the four for unique mating engagement with said single phase jumper plug when it is rotated one hundred eighty degrees relative to the first two mating engagements with said jumper plug.

13. The device as recited in claim 1 wherein said three phase jumper plug has a four row by three column orthogonal pattern of positioning stems, the stem pair consisting of the first stem in each of the first and second rows, the pair consisting of the second stem in each of the first and second rows, the pair consisting of the third stem in each of the first and second rows, the pair consisting of the first stem in each of the third and fourth rows, the pair consisting of the second stem in each of the third and fourth rows, and the pair consisting of the third stem in each of the third and fourth rows having an electrically conductive jumper plug stems extending within said three phase jumper plug between the stems of each of said pairs, outer free ends of each of said jumper comprising jumper pins extending out through an outer free end of each of said stems for mating engagement with the corresponding electrical receptacle in each receptacle cylinder in said connector socket.

14. The device recited in claim 13 wherein said jumper plug mates with one or the other of the first through fourth row and the second through fifth rows of said receptacles in said connector socket to complete the internal winding connections for series connected Y high voltage operation and parallel connected Y low voltage operation.

15. In a dynamoelectric machine including a housing having an enclosure, a terminal board in said enclosure, and a removably mounted cover plate permitting access to the terminal board, the improvement comprising a voltage change device mounted in said enclosure adjacent said cover plate, said voltage change device including a jumper plug having indicator means associated with it, said cover plate having a plurality of openings at different locations representing different jumper plug connections to said motor, information means provided on said cover plate adjacent each hole to inform a user of the specific jumper plug connection, said jumper plug indicating means being visible through one of the openings in said cover plate so as to disclose, by reading the information means adjacent an opening through which the jumper plug indicating means is visible, the operational connection of said jumper plug to said dynamoelectric machine, without removing said cover plate.

16. The improvement of claim 15 wherein said voltage change device further includes a connector socket having a plurality of spaced electrical receptacles, one end of said electrical receptacles being adapted to receive a mating connection and the other end of said electrical receptacles being electrically connected to the motor circuit for said motor, said jumper plug including a plurality of electrically conductive jumpers mating with pairs of electrical receptacles in said connector socket.

17. The improvement of claim 16 wherein said jumper plug further includes a function tang extending outwardly therefrom, and means associated with said terminal board for indicating the functional connection of said tang.

18. The improvement of claim 17 wherein said connector socket receptacles are arranged in a rectangular matrix of five rows by three columns, and said jumper pins are disposed in a mating matrix of four rows by three columns.

19. The improvement of claims 17 or 18 wherein said jumper plug has pins disposed in a matrix of one column by four rows interleaved between two columns of two rows.

20. The improvement of claim 16 wherein said connector socket is mountable on said terminal board and includes snap lock means for interconnecting said connector socket to said terminal board.

21. In a dynamoelectric machine having a terminal board for electrically connecting a source of electrical energy to said dynamoelectric machine, and a cover plate limiting access to said terminal board, the improvement comprising a voltage change device mounted to said terminal board adjacent said cover plate, said voltage change device including a jumper plug having indicator means associated with it, said cover plate having a plurality of openings at different locations representing different jumper plug connections to said motor, information means provided on said cover plate adjacent each hole to inform a user of the specific jumper plug connection, said jumper plug indicating means being visible through one of the openings in said cover plate so as to disclose, by reading the information means adjacent an opening through which the jumper plug indicating means is visible, the operational connection of said jumper plug to said dynamoelectric machine, without removing said cover plate.

* * * * *